J. B. REBELLET.
FUEL MIXER FOR INTERNAL COMBUSTION ENGINES.
APPLICATION FILED DEC. 3, 1919.

1,373,021. Patented Mar. 29, 1921.

Witnesses
Jean Germain
Guillaume Pioche

Inventor
Jean Baptiste Rebellet

UNITED STATES PATENT OFFICE.

JEAN BAPTISTE REBELLET, OF LYON, FRANCE.

FUEL-MIXER FOR INTERNAL-COMBUSTION ENGINES.

1,373,021. Specification of Letters Patent. Patented Mar. 29, 1921.

Application filed December 3, 1919. Serial No. 342,139.

*To all whom it may concern:*

Be it known that I, JEAN BAPTISTE REBELLET, a citizen of the French Republic, of 55 Rue de Marseille, Lyon, France, have invented certain new and useful Improvements in Fuel-Mixers for Internal-Combustion Engines, of which the following is a specification.

The object of the invention is to provide improved means for mixing gaseous or vaporized fuel with air for use in internal combustion engines.

The invention consists in a device adapted to be inserted between the carbureter and the motor cylinder and to effect a thorough stirring of the gases before their admission to the cylinder. This results in improved efficiency and in the avoidance of carbonization due to incomplete combustion of the explosive mixture.

The accompanying drawing illustrates, by way of example, one form of construction of one device.

Figure 1:
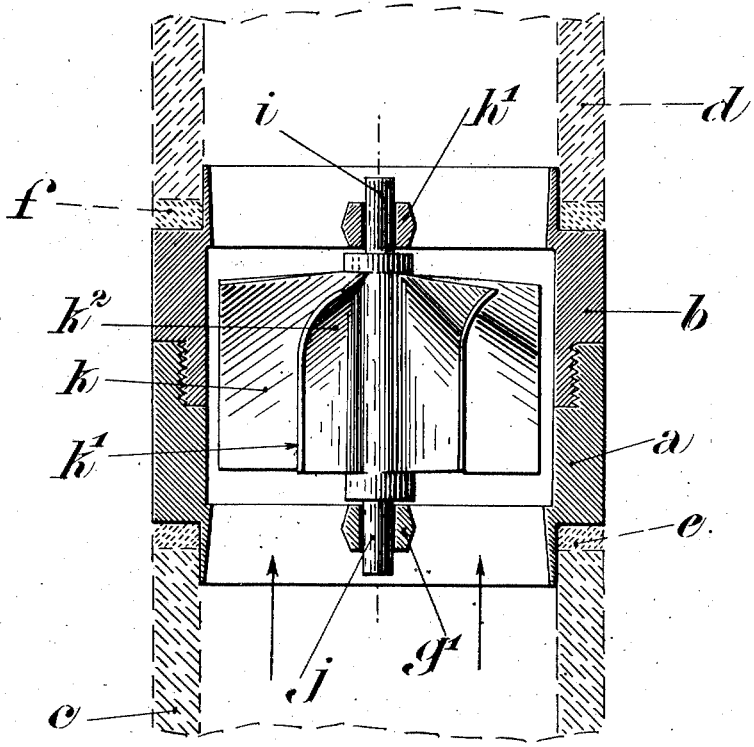
Figure 1 is a vertical section thereof.
Figure 2:
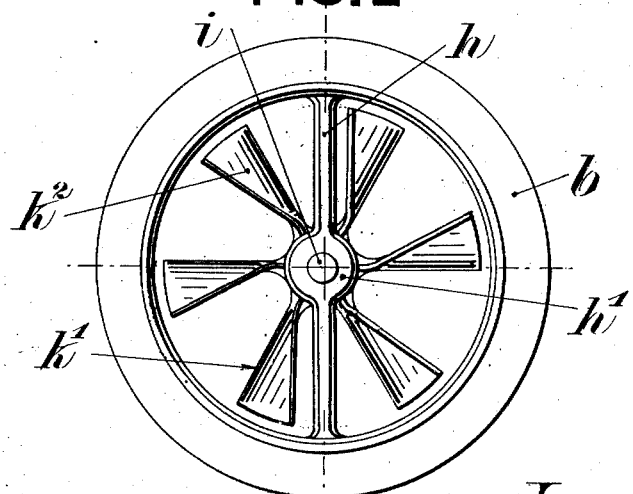
Fig. 2 is a plan view.

The apparatus is composed of a tubular body or conduit made in two parts $a$ $b$ screwed to each other and joined respectively to the pipe $c$ leading from the carbureter and the pipe $d$ leading to the engine. Washers $e$ and $f$ of suitable material are interposed to make the joints gas-tight.

Each of the parts $a$ and $b$ has a transverse arm $h$ and the arms $h$ are enlarged at their centers to form bearings $g^1$, $h^1$ for the axle gudgeons $i$ and $j$ of a fan $k$. The vanes of the fan are mounted on a central hub and comprise flat portions $k^1$ perpendicular to the said hub, and curved tips $k^2$ bent over to the side as shown.

The suction produced by the motor has the effect of causing an extremely rapid rotation of the fan and consequently of effecting an intimate mixing of the air and carburant, insuring efficient combustion of the mixture.

What I claim as my invention and desire to secure by Letters Patent of the United States is:—

A fuel mixing fan comprising a spindle and a plurality of substantially rectangular radial vanes fixed to said spindle, each of said vanes being flat as to its major part and having its tip at one end bent over laterally in a curve toward the adjacent vane at one side thereof, but not overhanging said adjacent vane.

In witness whereof I have signed this specification in the presence of two witnesses.

JEAN BAPTISTE REBELLET.

Witnesses:
JEAN GERMAIN,
MARIN VACHON.